United States Patent
Shiizaki et al.

(10) Patent No.: US 8,175,114 B2
(45) Date of Patent: May 8, 2012

(54) BASE STATION APPARATUS AND RECEPTION PROCESSING METHOD THEREOF

(75) Inventors: Kotaro Shiizaki, Kawasaki (JP); Kazuo Kawabata, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 533 days.

(21) Appl. No.: 12/358,392

(22) Filed: Jan. 23, 2009

(65) Prior Publication Data

US 2009/0131113 A1  May 21, 2009

Related U.S. Application Data

(63) Continuation of application No. PCT/JP2006/316263, filed on Aug. 18, 2006.

(51) Int. Cl.
  *H04J 3/16* (2006.01)
(52) U.S. Cl. ........................................... 370/468
(58) Field of Classification Search .................. None
  See application file for complete search history.

(56) References Cited

U.S. PATENT DOCUMENTS

| | | | |
|---|---|---|---|
| 2001/0041595 A1 | 11/2001 | Ikeda et al. | |
| 2002/0034936 A1 | 3/2002 | Itoh | |
| 2005/0009524 A1* | 1/2005 | Garani et al. | 455/445 |
| 2007/0104134 A1* | 5/2007 | Pecen et al. | 370/329 |
| 2007/0286066 A1* | 12/2007 | Zhang et al. | 370/208 |
| 2009/0131113 A1* | 5/2009 | Shiizaki et al. | 455/562.1 |

FOREIGN PATENT DOCUMENTS

| | | |
|---|---|---|
| EP | 1199816 | 4/2002 |
| JP | 05-268196 | 10/1993 |
| JP | 2001-24569 | 1/2001 |
| JP | 2001-168778 | 6/2001 |
| JP | 2002-64414 | 2/2002 |

OTHER PUBLICATIONS

International Search Report for the corresponding International Application No. PCT/JP2006/316263; date of completion Nov. 2, 2006.

* cited by examiner

*Primary Examiner* — Raj Jain
(74) *Attorney, Agent, or Firm* — Myers Wolin, LLC

(57) ABSTRACT

In a base station apparatus, signal processing units are connected to a corresponding antenna unit and another antenna unit, a part of resources for processing a signal received by the antenna unit corresponding to each signal processing unit is allocated to processing of a signal received by the other antenna unit, and the signals received by the corresponding antenna unit and the other antenna unit are subjected to multi-antenna reception processing using the resources.

12 Claims, 9 Drawing Sheets

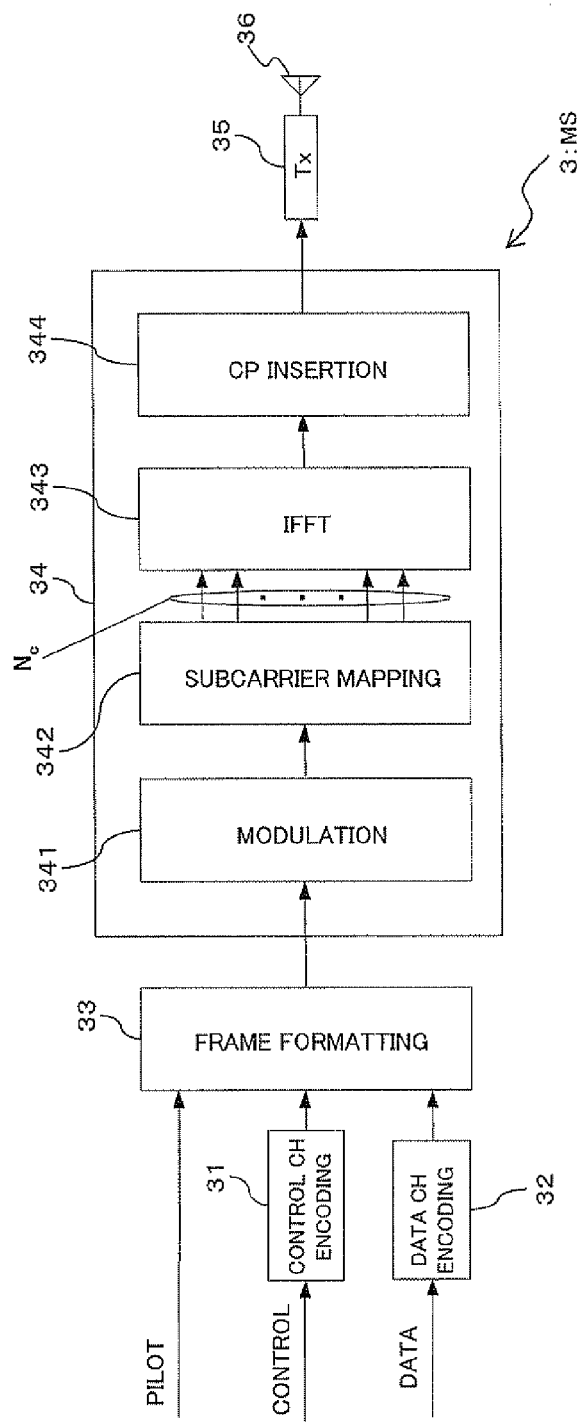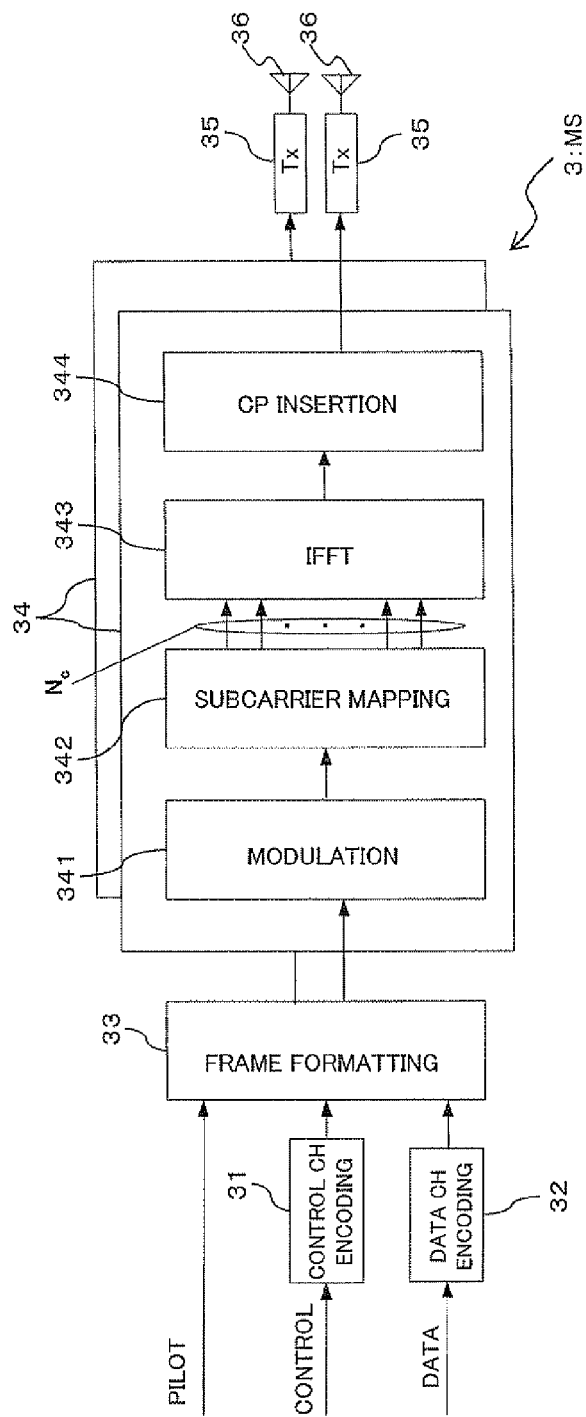
FIG. 5(A)
FIG. 5(B)

BASE STATION APPARATUS AND RECEPTION PROCESSING METHOD THEREOF

CROSS-REFERENCE TO RELATED APPLICATION(S)

This application is a continuation Application of a PCT international application No. PCT/JP2006/316263 filed on Aug. 18, 2006 in Japan, the entire contents of which are incorporated by reference.

FIELD

The embodiment(s) discussed herein is (are) related to a base station apparatus and a reception processing method thereof. The embodiment(s) relates to a technology suitable for, for example, a cellular communication system.

BACKGROUND

In a cellular communication system, a model in which mobile stations 102 are disposed within a cell 101 centering on a base station 100 as illustrated in FIG. 8 is supposed. Also, in a cellular communication system, a structure in which a cell is divided into a plurality of zones (called sectors) 101-1 to 101-$n$ (n is an integer equal to or more than 2, and n=3 in FIG. 9), and a directional antenna apparatus (hereinafter, sector antenna) 110-$i$ is provided for each sector 101-$i$ (i=1 to n) as illustrated in FIG. 9 is used. In other words, in the example of FIG. 9, the sector antenna 110-$i$ performs beam formation to cover each sector 101-$i$ as a wireless zone and performs communications with the mobile station 102 which is located within the sector 101-$i$.

If such zone division is performed by the sector antenna 110-$i$ (directional beam) as described above, due to difference of an antenna gain, influence of interference waves of other directions than a desired direction can be reduced, and influence of interference waves of other sectors 101-$i$ can also be reduced.

In such a cellular communication system, a redundant structure is formed to cope with a situation that a signal receiving circuit of the sector antenna 110-$i$ is out of order. As a representative redundant structure, there is an NE structure (for example, see Patent Document 1). In the NE structure, an operating system (normal: N) which is used during a normal operation and a preliminary system (emergency: E) which is used when the operating system cannot normally operate due to a failure are formed, and when the operating system is out of order, processing is performed by switching to the preliminary system.

[Patent Document 1] Japanese Laid-open Patent Publication No. 5-268196

However, such a redundant structure requires a complicate control algorithm or a preliminary circuit to be provided in advance only to cope with a failure, which is a wasteful component, and increases the cost.

Further, there occurs the following problem. In a cellular communication system, a mobile station (hereinafter, "terminal") located in the vicinity of a sector boundary undergoes characteristics deterioration in an uplink (direction from a mobile station to a base station apparatus) communication. In other words, in the vicinity of a sector boundary, a signal of an adjacent sector functions as an interference wave, and thus a signal received from this zone becomes deteriorated and has a low reception quality. As a result, retransmission is frequently required, so that the throughput is lowered. If the throughput of terminals located in the vicinity of a sector boundary remains lowered, the terminal throughput of the entire sector and accordingly the entire cell is also lowered. This is a problem which has to be resolved even in the viewpoint of cell coverage.

SUMMARY (1) According to an aspect of the embodiment, an apparatus includes a base station apparatus that wirelessly communicates with a wireless terminal includes: a plurality of antenna units that form a plurality of wireless zones; and a plurality of signal-processing units that are provided corresponding to the plurality of antenna units, wherein the signal processing unit is connected at least to a corresponding antenna unit and another antenna unit, and the signal processing unit includes a control unit that allocates a part of resources for processing a signal received by the corresponding antenna unit to processing of a signal received by the other antenna unit; and a multi-antenna reception processing unit that performs multi-antenna reception processing of signals received by the corresponding antenna unit and the other antenna unit from the wireless terminal using the resources.

(2) According to an aspect of the embodiment, the multi-antenna reception processing unit is configured as a diversity/MIMO reception processing unit that performs diversity or MIMO reception processing of the received signals.

(3) According to an aspect of the embodiment, the diversity/MIMO reception processing unit is configured to select diversity or MIMO reception processing based on a notification signal from the wireless terminal.

(4) According to an aspect of the embodiment, the control unit includes a determining unit that determines whether the received signals are signals from the wireless terminal that is located in the vicinity of a boundary between different wireless zones; and a first setting unit that allocates a part of the resources to processing of a signal received by the other antenna unit after the determining unit determines that the received signals are signals from the wireless terminal that is located in the vicinity of a boundary between different wireless zones.

(5) According to an aspect of the embodiment, the base station apparatus-further includes a malfunction monitoring unit that monitors a malfunction occurring in any of the signal processing units, and the control unit includes a second setting unit that allocates a part of the resources to processing of a signal received by the other antenna unit when the malfunction monitoring unit detects a malfunction occurring in another signal processing unit.

(6) According to an aspect of the embodiment, the base station apparatus is a base station apparatus in a cellular communication system, and the antenna unit and the signal processing unit are provided for each sector as the wireless zone.

(7) According to an aspect of the embodiment, a method includes a reception processing method of a base station apparatus, in the base station apparatus that wirelessly communicates with a wireless terminal and includes a plurality of antenna units that form a plurality of wireless zones and a plurality of signal processing units provided corresponding to the plurality of antenna units, the signal processing unit being connected at least to a corresponding antenna unit and another antenna unit, the signal processing unit allocates a part of resources for processing a signal received by the corresponding antenna unit to processing of a signal received by the other antenna unit and performs multi-antenna reception processing of the signals received by the corresponding antenna unit and the other antenna unit from the wireless terminal using the resources.

(8) According to an aspect of the embodiment, the signal processing unit performs diversity or MIMO reception processing of the received signals.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 is a block diagram illustrating a configuration of a mobile station (MS) illustrated in FIG. 1, FIG. 5(A) is a block diagram illustrating configurations of main components of the MS which has a diversity configuration (or operates in a diversity mode), and FIG. 5(B) is a block diagram illustrating configurations of main components of the MS which has a MIMO configuration (or operates in a MIMO mode);

DESCRIPTION OF THE EMBODIMENTS

Hereinafter, an embodiment will be described. However, the embodiment is not limited to the embodiment described below, and can be embodied in various forms without departing from the spirit thereof.

Figure 1:
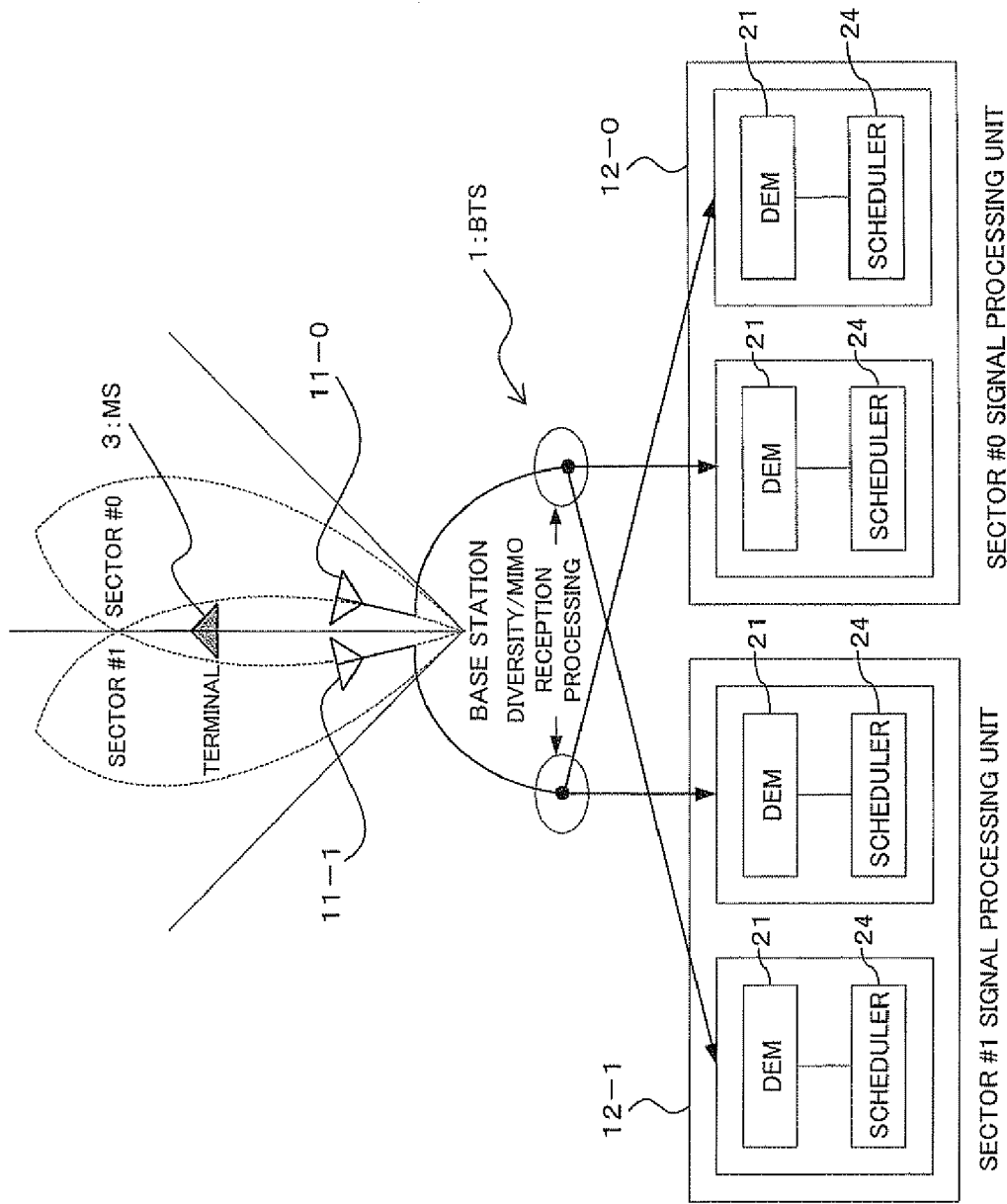
FIG. 1 is a block diagram illustrating a cellular communication system according to an embodiment.

FIG. 1 is a block diagram illustrating a cellular communication system according to an embodiment. The cellular communication system of FIG. 1 includes, for example, a base station apparatus (BTS: Base Transceiver Station) 1 provided in each cell and a mobile station (MS: Mobile Station) 3 which is a wireless terminal that performs a wireless communication in the wireless zone formed by the BTS1. The BTS1 is further configured to include transceiver antennas (sector antennas) 11-0 to 11-$n$ ($n$ is an integer equal to or larger than 1, and $n=1$ in the case of FIG. 1) for each sector #$i$ ($i=0, 1, \ldots, n$) obtained by dividing the cell into a plurality of zones; and signal processing units 12-0 to 12-$n$ for each sector #$i$. However, a plurality of sector antennas 11-$i$ may be provided for each sector #$i$. In this case, "sector antenna 11-$i$" means a plurality of antennas belonging to a first group, and an antenna group for each sector #$i$ may be called "antenna unit".

Each sector antenna 11-$i$ is connected to the signal processing unit 12-$i$ of a corresponding sector #$i$ and is also connected to the signal processing units 12-($i$+1) and 12-($i$−1) of the adjacent sectors #($i$+1) and #($i$−1) (in the latter, $n \geq 2$). In other words, in the example of FIG. 1, the sector antenna 11-0 which is in charge of the sector #0 is connected to the signal processing unit 12-0 of the sector #0 and the signal processing unit 12-1 of the adjacent sector #1, and the sector antenna 11-1 which is in charge of the sector #1 is connected to the signal processing unit 12-1 of the sector #1 and the signal processing unit 12-0 of the adjacent sector #0.

Figure 2:
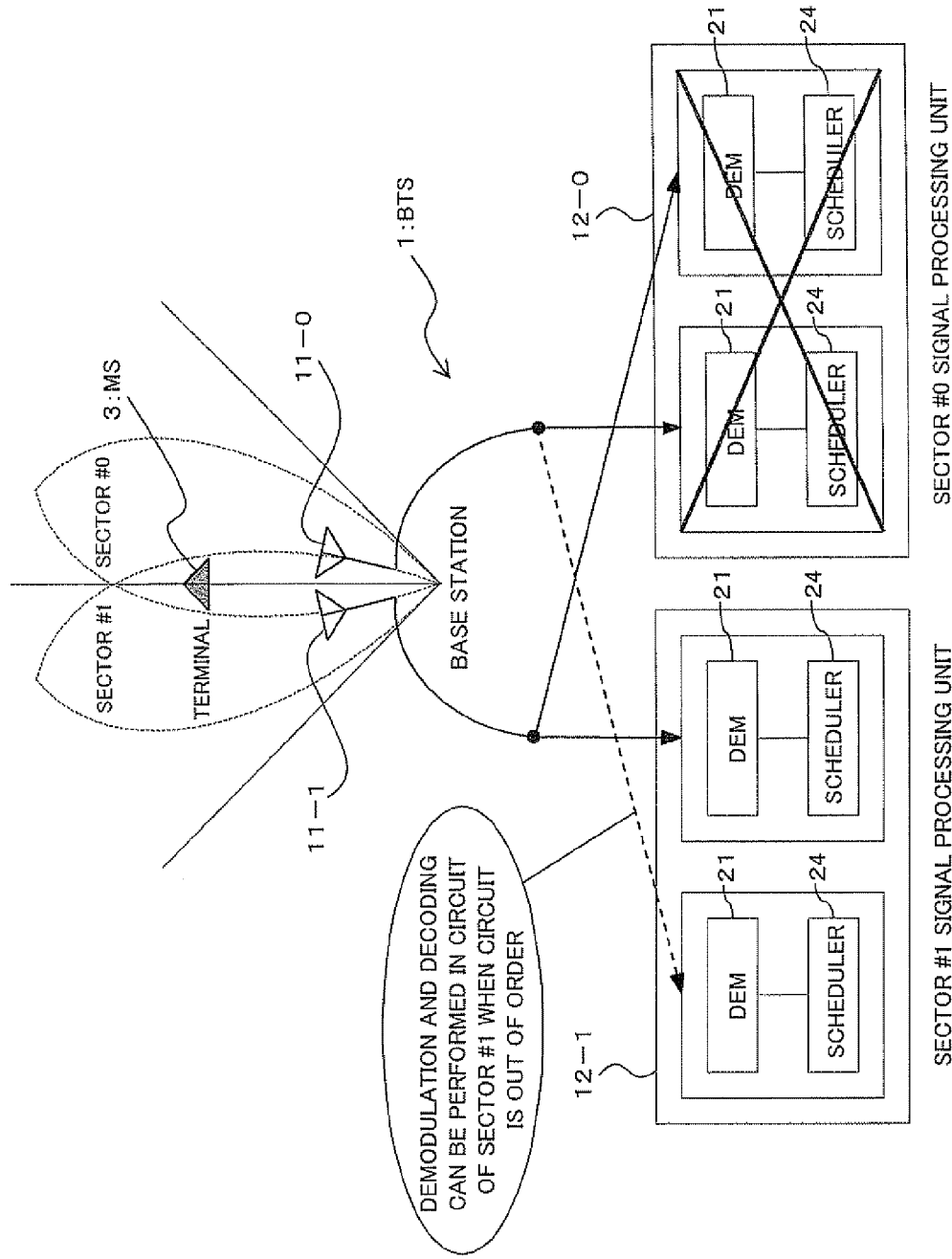
FIG. 2 is a block diagram illustrating processing when failure occurs in a certain signal processing unit of a base station apparatus (BTS) illustrated in FIG. 1.

In other words, sector antennas #$i$ of a plurality of different sectors #$i$ are additionally connected to the signal processing unit 12-$i$ of a certain sector #$i$. As described above, because sector antennas 11-$i$ of a plurality of different sectors #$i$ are previously connected to the signal processing unit 12-$i$ of a certain sector #$i$, as illustrated in FIG. 2, even when the signal processing unit 12-$i$ of the sector #$i$ is out of order, received data can be demodulated or decoded in the different signal processing unit 12-$i$ which is connected thereto in advance.

Figure 3:
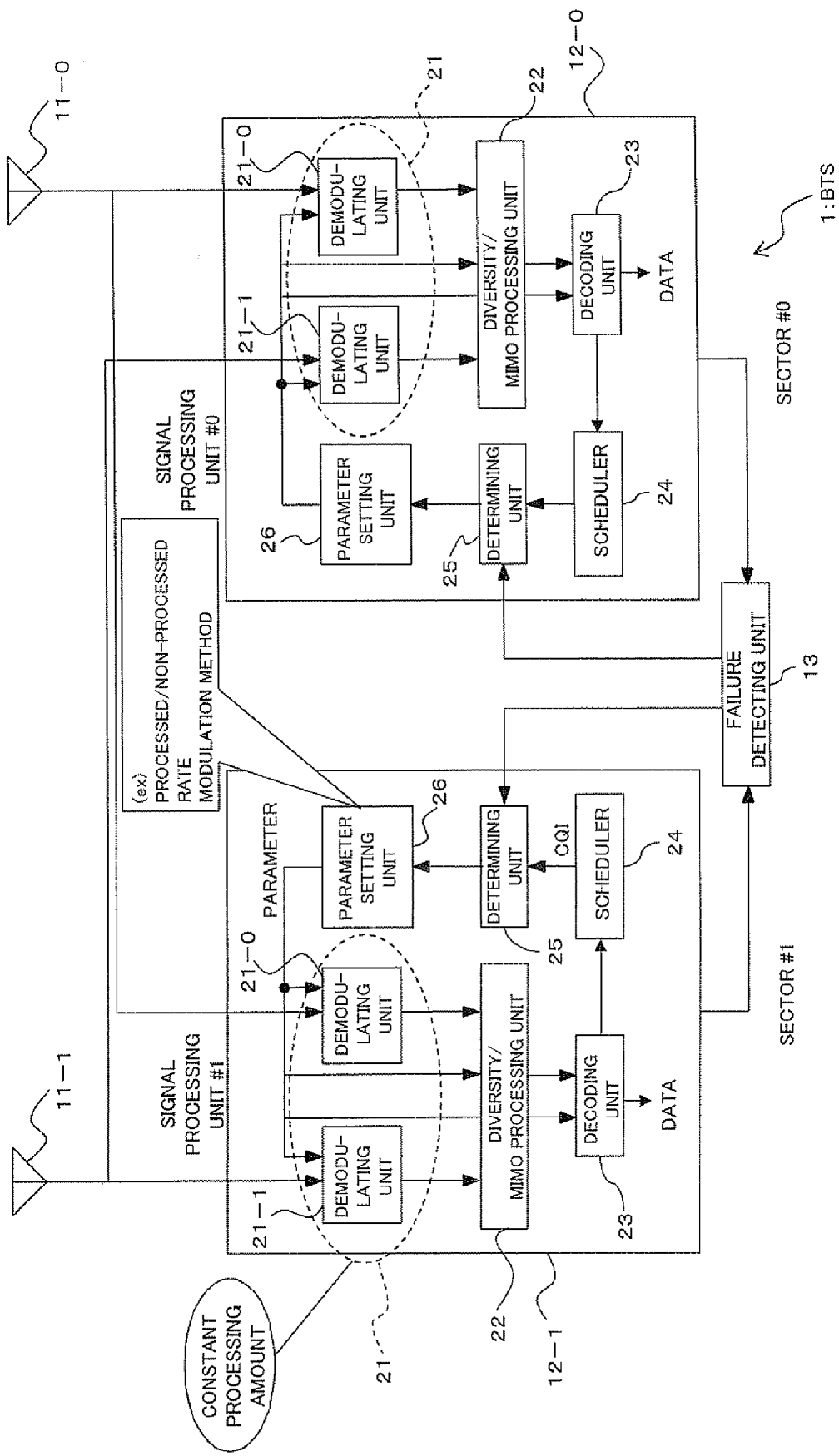
FIG. 3 is a block diagram illustrating a configuration of a signal processing unit of the BTS illustrated in FIG. 1.

If such a connection mode is applied to an uplink communication as illustrated in FIG. 1, diversity reception or MIMO reception between the sectors #$i$ can be performed. Therefore, an error rate characteristic of a signal received from an MS3 located in the vicinity of a sector boundary can be improved, whereby the throughput of the sector of the uplink communication and accordingly of the entire cell can be improved. Here, in FIGS. 1 and 2, a reference numeral 21 denotes a demodulating unit (DEM), and a reference numeral 24 denotes a scheduler. In FIG. 3, same reference numerals as FIGS. 1 and 2 denote same parts, and such parts will be described below in detail with reference to FIG. 3.

FIG. 3 is a block diagram illustrating a configuration of the signal processing unit 12-$i$ of the BTS1. As illustrated in FIG. 3, the BTS1 further includes a malfunction detecting unit 13 in addition to the sector antenna 11-$i$ and the signal processing unit 12-$i$ which are described above. The signal processing unit 12-$i$ includes, for example, a demodulating unit 21, a diversity/MIMO processing unit 22, a decoding unit 23, a scheduler 24, a determining unit 25, and a parameter setting unit 26.

The failure detecting unit (malfunction monitoring unit) 13 monitors an operation state of each signal processing unit 12-$i$ to detect a failure (malfunction) occurrence. For example, it can be realized such that it is determined that failure has occurred based on a phenomenon that each signal processing unit 12-$i$ does not output a signal through a control unit or the like that is not illustrated even after a predetermined time lapses, and the determination result is aggregated in the failure detecting unit 13 via, for example, a bus.

In the signal processing unit 12-$i$, the demodulating unit 21 receives received signals from a plurality of sector antenna 11-$i$ in the above-described connection mode and performs demodulation processing using a demodulation method corresponding to a modulation method (for example multi-value modulation method such as QPSK or 16QAM) of an MS3 side. In FIG. 3, for easy understanding, in each signal processing unit 12-$i$, the demodulating units 21-0 and 21-1 are provided for each sector antenna 11-$i$, and an uplink signal received through the sector antenna 11-0 from the sector #0 is demodulated in the demodulating unit 21-0 of each signal processing unit 12-$i$, and an uplink signal received through the sector antenna 11-1 from the sector #1 is demodulated in the demodulating unit 21-1 of each signal processing unit 12-$i$, but the demodulating units 21-0 and 21-1 can be realized as a single demodulating unit 21. In other words, the demodulating units 21-0 and 21-1 of FIG. 3 represent that processing ability (demodulation function) of the single demodulating unit 21 is divided separately for the sector antenna 11-$i$. Therefore, the collective processing amount of the demodulating unit 21 is constant, and an allocation (ratio) of the processing amount to each sector #$i$ can be appropriately changed. The detail will be described later.

The diversity/MIMO processing unit 22 performs diversity composition or MIMO reception processing (signal separation) in a case of MIMO transmission of the MS3 with respect to the uplink received signal demodulated in the demodulating unit 21. It is determined or set by the determining unit 25 and the parameter setting unit 26 whether to perform diversity composition or MIMO reception processing (hereinafter, occasionally referred to as simply "reception processing") with respect to a certain uplink received signal (in other words, an allocation of resources necessary for signal processing). In other words, the diversity/MIMO processing unit 22 functions as a multi-antenna reception processing unit that performs multi-antenna reception processing using the resources with respect to signals received in the sector antennas 11-$i$ of the different sectors #$i$ from the MS3.

The decoding unit 23 decodes a signal which has undergone diversity composition or MIMO reception processing of the diversity/MIMO processing unit 22 using a decoding method corresponding to a coding method (for example, error correction coding method such as turbo coding) of an MS3 side.

The scheduler 24 schedules (controls) transmission processing of a downlink transmitting signal based on scheduling information (which includes information necessary for demodulation and decoding such as a modulation method, a coding rate, and diversity/MIMO information) related to a downlink transmitting signal to be transmitted to the MS3. For example, the scheduler 24 can transmit a downlink transmitting signal at a higher cording rate, with larger transport block size and by higher speed modulation method as the downlink reception quality is better, based on downlink reception quality information such as a CQI (Channel Quality Identifier) reported (feedback) from the MS3 (which is called an AMC (AMC: Adaptive Modulation and Coding)). In FIG. 3, a downlink transmission processing system of the BTS1 is not illustrated.

The determining unit 25 determines parameters necessary for processing (operation) of the demodulating unit 21, the diversity/MIMO processing unit 22 and the decoding unit 23, for example, parameters which specify (designate) a demodulation method of the demodulating unit 21, a reception processing method of the diversity/MIMO processing unit 22 and a decoding method of the decoding unit 23. In the embodiment, the determining unit 25 determines which one among received signals of the sector antennas 11-$i$ of a plurality of different sectors (connection sectors) #$i$ which the MS3 simultaneously accesses will be demodulated and decoded based on the failure detecting result of the failure detecting unit 13 and the reception quality information (based on this information, it is possible to determine whether the MS3 is located in the vicinity of a sector boundary or not) of the scheduler 24 and determines parameters according to the determination result (a detailed determination procedure will be described later). As a determination criterion, for example, either (1) that only a received signal from the MS3 located in the vicinity of a sector boundary is combined or (2) that a signal with a receiving level or CQI information lower than a predetermined threshold value is not used, can be used. It is possible to determine whether the MS3 is located in the vicinity of a sector boundary or not by using CQI information of the scheduler 24 or by measuring position information of the MS3 using a global positioning system (GPS).

The parameter setting unit 26 sets the parameters determined in the determining unit 25 to the demodulating unit 21, the diversity/MIMO processing unit 22 and the decoding unit 23, respectively. As a result, if a certain signal processing unit 12-$i$ is out of order, demodulation and decoding processing, or diversity reception or MIMO reception between the sectors #$i$ can be performed by another signal processing unit 12-$i$.

In other words, the scheduler 24, the determining unit 25 and the parameter setting unit 26 function as a control unit that allocates a part of resources for processing a signal received in a corresponding sector antenna 11-$i$ to processing of a signal received in any other sector antenna 11-$j$, and the parameter setting unit 26 performs functions of (a) and (b) described below.

(a) Function of a first setting unit that allocates a part of the resources to processing of a signal received in any other sector antenna 11-$j$ if the determining unit 25 determines that each of the received signals received in both sector antennas 11-$i$ and 11-$j$ is a signal transmitted from the MS3 located in the vicinity of a sector boundary.

(b) Function of a second setting unit that allocates a part of the resources to processing of a signal received in any other sector antenna 11-$j$ if the failure detecting unit 13 detects failure occurring in another signal processing unit 12-$j$.

Figure 4:
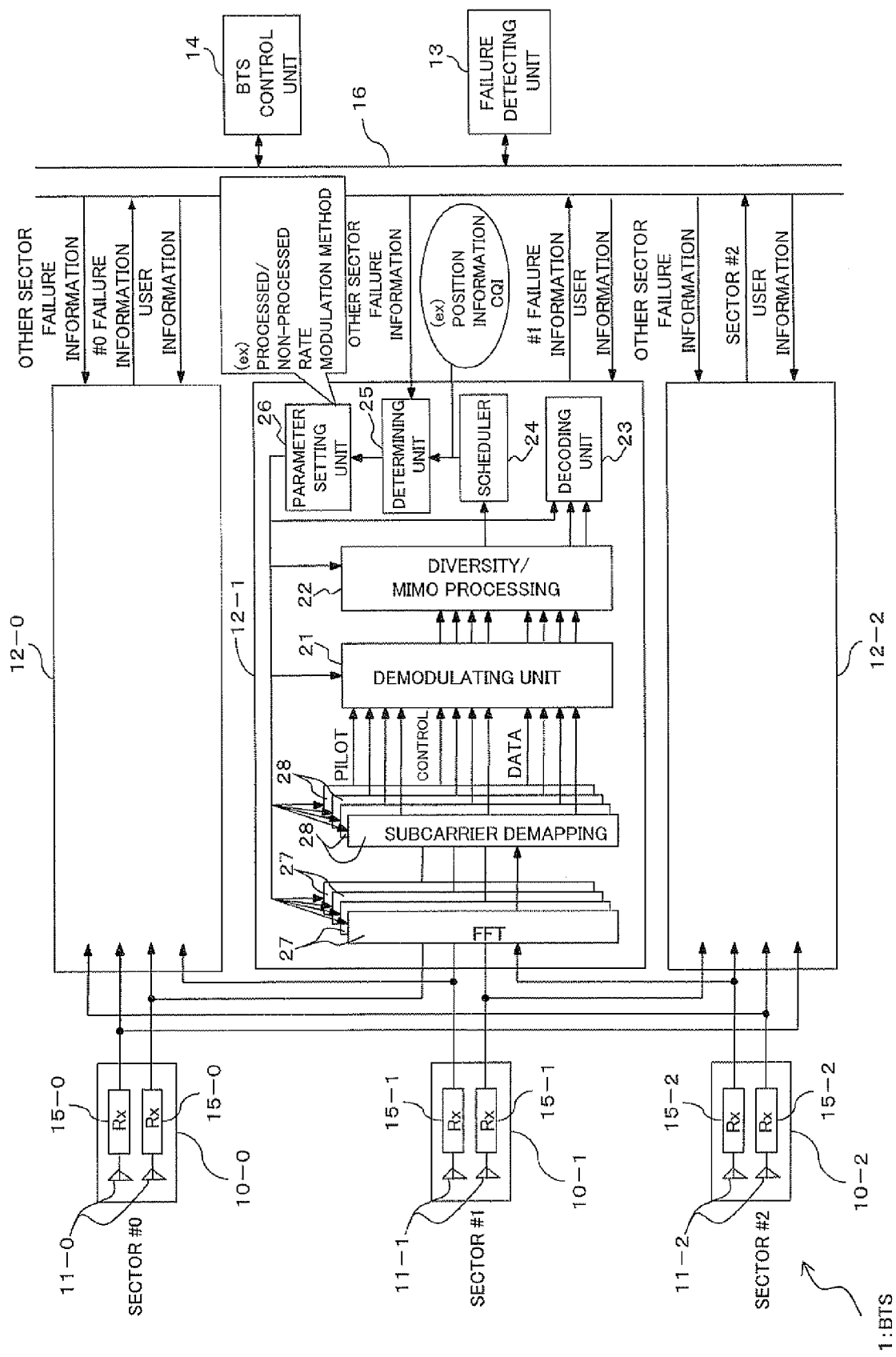
FIG. 4 is a block diagram illustrating a detailed configuration of the BTS illustrated in FIG. 3.

Next, a detailed configuration of the BTS1 will be described with reference to FIG. 4. FIG. 4 illustrates a configuration of a BTS when n=2, in other words, one cell is divided into three sectors (for example, see FIG. 9). Also, it is assumed that a downlink communication from the BTS1 to the MS3 is a multi-carrier communication such as OFDM (Orthogonal Frequency Division Multiplexing).

Figure 9:
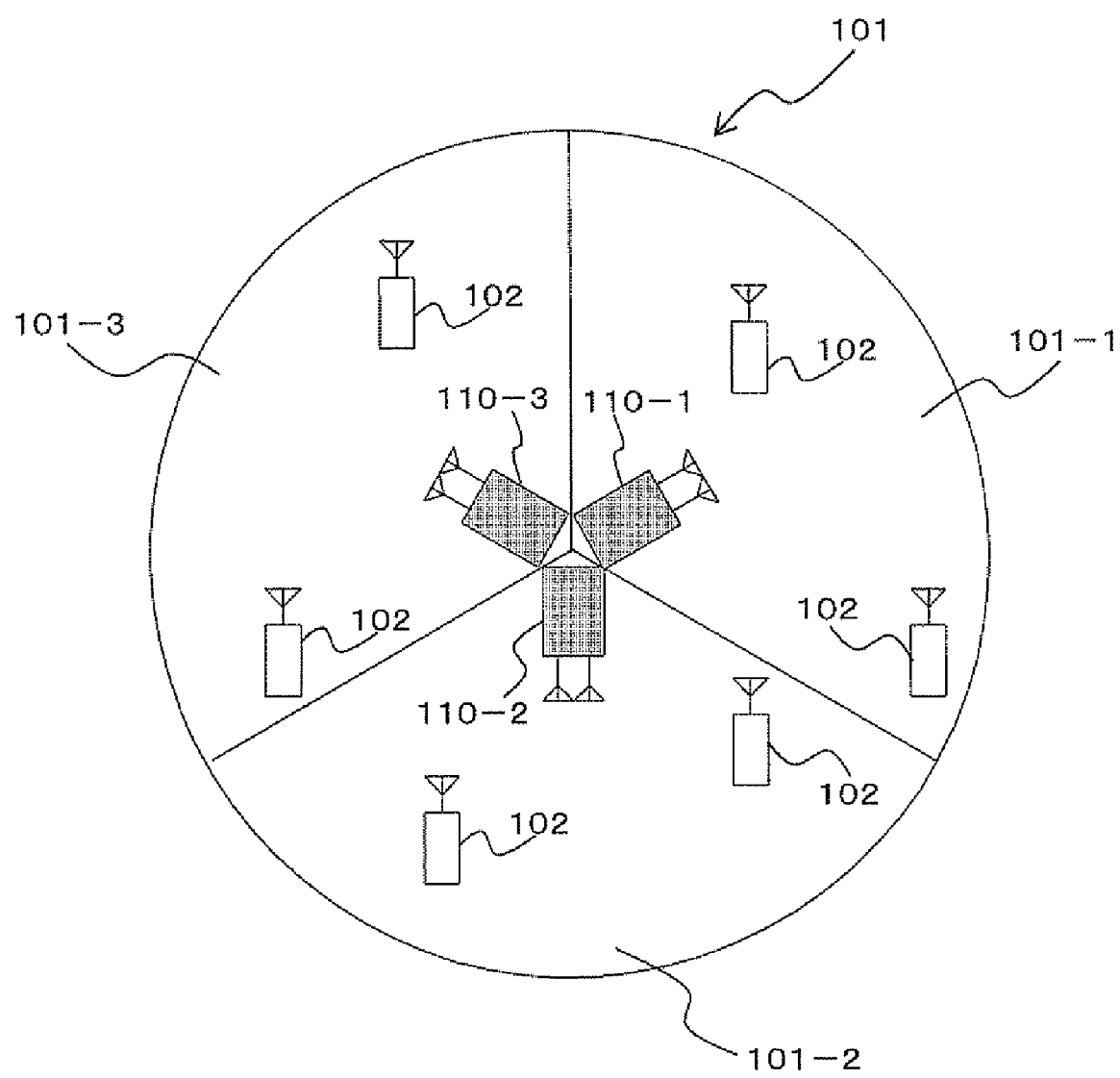
FIG. 9 is a schematic diagram illustrating a state of a sector communication by a base station apparatus in the cellular communication system illustrated in FIG. 8.

In other words, the BTS1 of FIG. 4 includes an antenna unit 10-0 corresponding to a sector #0, an antenna unit 10-1 corresponding to a sector #1 and an antenna unit 10-2 corresponding to a sector #2 which are arranged adjacent to each other as illustrated in FIG. 9, and also includes signal processing units 12-0, 12-1 and 12-2 corresponding to the sectors #0, #1 and #2, and a failure detecting unit 13 and a BTS control unit 14 which are connected to communicate with each other via a bus 16. Each antenna unit 10-$i$ includes two sets of sector antennas 11-$i$ and wireless receivers (Rx) 15-$i$. However, in FIG. 4, an internal configuration of the signal processing unit 12-1 of the sector #1 is illustrated, but internal configurations of the signal processing units 12-0 and 12-2 are not illustrated. Further, a downlink transmission processing system of the BTS1 is not illustrated.

Outputs of the two wireless receivers 15-0 of the antenna unit 10-0 of the sector #0 are connected to the signal processing unit 12-0, and one output of the wireless receivers 15-0 is also connected to the signal processing unit 12-1 of the sector #1, and the other output of the wireless receivers 15-0 is also connected to the signal processing unit 12-2 of the sector #2. Similarly, outputs of the two wireless receivers 15-1 of the antenna unit 10-1 of the sector #1 are connected to the signal processing unit 12-1, and one output of the wireless receivers 15-1 is also connected to the signal processing unit 12-0 of the sector #0, and the other output of the wireless receivers 15-1 is also connected to the signal processing unit 12-2 of the sector #2. Also, outputs of the two wireless receivers 15-2 of the antenna unit 10-2 of the sector #2 are connected to the signal processing unit 12-2, and one output of the wireless receivers 15-2 is also connected to the signal processing unit 12-0 of the sector #0, and the other output of the wireless receivers 15-2 is also connected to the signal processing unit 12-1 of the sector #1.

In other words, the BTS1 of FIG. 4 is configured such that the three antenna units 10-*i* are respectively connected to the corresponding signal processing units 12-*i* and are also connected to the signal processing units 12-*i* of the other adjacent sectors #i, and so all the signal processing units 12-*i* can process signals received in the antenna units 12-*i* of all the sectors #i. Also, in each antenna unit 10-*i*, the wireless receiver 15-*i* performs wireless reception processing such as frequency conversion (down converter) to a base band signal or analog-to-digital (AD) conversion with respect to a wireless signal received in the sector antenna 11-*i*.

Because a multi-carrier communication such as OFDM is presumed, each signal processing unit 12-*i* includes a FFT (Fast Fourier Transformer) 27 and a subcarrier demapping unit 28 in addition to the demodulating unit 21, the diversity/MIMO processing unit 22, the decoding unit 23, the scheduler 24, the determining unit 25, and the parameter setting unit 26 which are described above.

As the FFT 27, four sets are provided corresponding to four lineage uplink received signals of total four wireless receivers 15-*i* which includes two wireless receivers 15-*i* of the antenna unit 10-*i* and one wireless receiver 15-*i* of each of two antenna units 10-*i* of other adjacent-sectors #i. Each FFT 27 performs FFT processing of an uplink received signal from the wireless receiver 15-*i* to thereby convert a time-area signal into a frequency-area signal.

As the subcarrier demapping unit 28, four sets are provided corresponding to the FFTs 27. Each subcarrier demapping unit 28 extracts a signal of a pilot channel, a signal of a control channel or a signal of a data channel which is mapped with a subcarrier frequency from an uplink received signal of a frequency-area obtained by FFT processing of the corresponding FFT 27.

In the FFT 27 and the subcarrier demapping unit 28, a parameter is set (controlled) by the parameter setting unit 26 so that their processing (operation) can be effective only for a lineage which the determining unit 25 determines as having to be used in demodulation processing of the demodulating unit 21 and reception processing of the diversity/MIMO processing unit 22.

As a result, the demodulating unit 21 performs necessary demodulation processing with respect to each FFT 27 and each subcarrier demapping unit 28 in common by estimating distortion of an uplink propagation path between the BTS1 and the MS3 using a correlation computation of the received pilot signal and a replica of the pilot signal (in other words, computes a channel estimation value) and compensating (channel compensating) distortion of a signal of the control channel or the data channel based on the channel estimation value. Therefore, in the embodiment, the diversity/MIMO processing unit 22 is also configured to perform necessary reception processing with respect to each FFT 27 and each subcarrier demapping unit 28 in common.

The BTS control unit 14 controls an overall operation of the BTS1 and is configured to control an operation of each signal processing unit 12-*i* or an operation of each antenna unit 10-*i* via the bus 16. Particularly, in this example, scheduling information of the sector #i which has to be processed can be transferred to the scheduler 24 of the signal processing unit 12-*i* of the other sector #i than the corresponding sector #i via the bus 16.

Next, a configuration of the MS3 when a multi-carrier communication is presumed will be described with reference to FIG. 5(A) and FIG. 5(B). FIG. 5(A) is a block diagram illustrating configurations of main components of the MS3 which has a diversity configuration (or, operates in a diversity mode), and FIG. 5(B) is a block diagram illustrating configurations of main components of the MS3 which has a MIMO configuration (or, operates in a MIMO mode). In this example, it is supposed that communications with the BTS1 are performed in an environment where these MS3s are mixed.

The MS3 of FIG. 5(A) includes, for example, a control channel (CH) encoding unit 31, a data channel (CH) encoding unit 32, a frame formatting unit 33, a signal processing unit 34 which includes a demodulating unit 341, a subcarrier mapping unit 342, an IFFT (Inverse FFT) 343, and a CP inserting unit 344, a wireless transmitter (Tx) 35, and a transmitting antenna 36.

The control channel encoding unit 31 encodes a control signal (a CQI value described above or a diversity/MIMO notice signal described later) which is to be transmitted to the BTS1 through a control channel into a necessary code such as a convolutional code, and the data channel encoding unit 32 encodes a data signal to be transmitted to the BTS1 through a data channel into a required error correction code (ECC) such as a turbo code.

The frame formatting unit 33 serially outputs a pilot signal to be transmitted to the BTS1 through a pilot channel, and a control signal and a data signal which are respectively encoded by the encoding units 31 and 32 in a form suitable for a predetermined uplink frame format.

In the signal processing unit 34, the modulating unit 341 modulates a signal input serially from the frame formatting unit 33 by using a predetermined modulation method such as QPSK or 16QAM (a transmitting signal is mapped on an IQ complex plane for each symbol of a predetermined bit number according to a modulation method), and the subcarrier mapping unit 342 maps a transmitting signal modulated by the modulating unit 341 with $N_c$ ($N_c$ is an integer equal to or more than 2, for example 512) subcarriers (frequencies) in a frequency-area.

The IFFT 343 performs IFFT processing of each subcarrier signal with which a transmitting modulation signal is mapped by the subcarrier mapping unit 342 to convert the signal to a signal of a time-area. The CP inserting unit 344 inserts a cycle prefix (CP) for each transmitting symbol as a guard interval into a signal which has undergone the IFFT processing so that tolerance to interference between symbols mainly resulting from delay of frequency selectivity can be improved.

The wireless transmitter 35 has a required wireless transmission processing function such as DA conversion or frequency conversion (up converter) to a predetermined transmitting radio frequency (RF) with respect to a signal into which the CP is inserted. The transmitting antenna 36 radiates the transmitting RF signal from the wireless transmitter 35 into the air toward the BTS1.

In the MS3 with the above-described configuration, a control signal and a data signal to be transmitted to the BTS1 are respectively encoded by the control channel encoding unit 31 and the data channel encoding unit 32 and are multiplexed with a pilot signal by the frame formatting unit 33 to thereby be serially output in a predetermined uplink frame format.

The serial output is demodulated by the modulating unit 341 in a required modulation method such as QPSK or 16QAM, is mapped with a predetermined subcarrier by the subcarrier mapping unit 342, and is IFFT-processed in the IFFT 343 to be converted to a signal of a time-area, and a CP is inserted for each transmitting symbol by the CP inserting unit 344.

The transmitting signal into which the CP is inserted is DA-converted and up-converted to a transmitting RF signal by the wireless transmitter 35, and is then transmitted to the BTS1 by the transmitting antenna 36.

The MS3 of FIG. 5(B) includes the encoding units 31 and 32 and the frame formatting unit 33 which are described above and includes a plurality of the signal processing units 34, the wireless receivers 35 and the transmitting antennas 36 (here, two sets) which are described above, and perform a 2×2 MIMO communication with the antenna unit 10-$i$ of the BTS1 (two sets of the receiving antennas 15-$i$).

Hereinafter, an operation of the cellular communication system (BTS1 and MS3) with the above-described configuration will be described in detail.

(1) Summary of Overall Operation of BTS1

An uplink received signal received in the antenna unit 10-$i$ (sector antenna 11-$i$) from the MS3 is input to the signal processing unit 12-$i$. The signal is FFT-processed in the FFT processing unit 27 to be converted to a frequency-area signal, and is then subcarrier-demapped in the subcarrier demapping unit 28 to be divided into a pilot signal, a control signal and a data signal which are respectively input to the demodulating unit 21.

The demodulating unit 21 demodulates the control signal and the data signal based on a channel estimation value obtained from the pilot signal. Demodulated data is subject to diversity composition or MIMO signal separation in the diversity/MIMO processing unit 22, and is then decoded in the decoding unit 23. Control information among decoded information includes, for example, measurement information (for example, CQI information) and position information of the MS3 and thus is transmitted to the scheduler 24.

The determining unit 25 determines whether to perform processing of a received signal of a different sector #j (j=0 to n, j≠i) or not based on failure information from the failure detecting unit 13 and the control information (feedback information from the MS3). In this example, this processing is performed in two cases: (a) the signal processing unit 12-$j$ of the adjacent sector #j is out of order; and b) the corresponding MS3 is located in the vicinity of a sector boundary.

Regarding the case (a), the signal processing unit 12-$i$ of the sector #i acquires failure information. For example, it is determined that failure has occurred based on a phenomenon that there is no signal output even after a predetermined time lapses. Acquired failure information is aggregated in the failure detecting unit 13 via the bus 16. If there is the sector (hereinafter, failed sector) #j in which the signal processing unit 12-$j$ is out of order, the failure detecting unit 13 notifies failure information to the determining unit 25 of the signal processing unit 12-$i$ of the sector #i to which processing is entrusted among other sectors #i which are connected to the sector antenna 11-$j$ of the failed sector #j via the bus 16.

Upon reception of the failure information, the signal processing unit 12-$i$ (scheduler 24) of the sector #i which takes over processing also takes over scheduler information (which includes information necessary for demodulation and decoding such as a modulation method, a coding rate, diversity/MIMO information, and feedback information) of the failed sector #j from the BTS control unit 14 which has aggregated scheduler information of each sector #j.

Therefore, the signal processing unit 12-$i$ of the sector #i which takes over processing becomes able to demodulate and decode an uplink received signal received in the sector antenna 11-$j$ of the failed sector #j based on scheduler information of the failed sector #j and the scheduler information of the subject sector #i.

On the other hand, regarding the case (b), it is determined whether the MS3 is located in the vicinity of a sector boundary or not based on the feedback information (position information or CQI information of MS3), and according to the determination result, it is determined whether to process an uplink received signal received in the sector antenna 11-$j$ of any other adjacent sector #j (irrespective of an occurrence of a failure) or not.

In both cases (a) and (b), if it is determined to process a received signal of the adjacent sector #j, information (parameters) necessary for demodulation and decoding is transmitted to the subcarrier demapping unit 28, the demodulating unit 21 and the diversity/MIMO processing unit 22 by the parameter setting unit 26. A coding rate and a modulation method of a received signal are also notified. Such information is acquired through the scheduler 24. Also, as described above, scheduler information of the sector #j which has to be processed is taken over through the BTS control unit 14 which is connected to the signal processing unit 12-$i$ of each sector #i.

Figure 6:
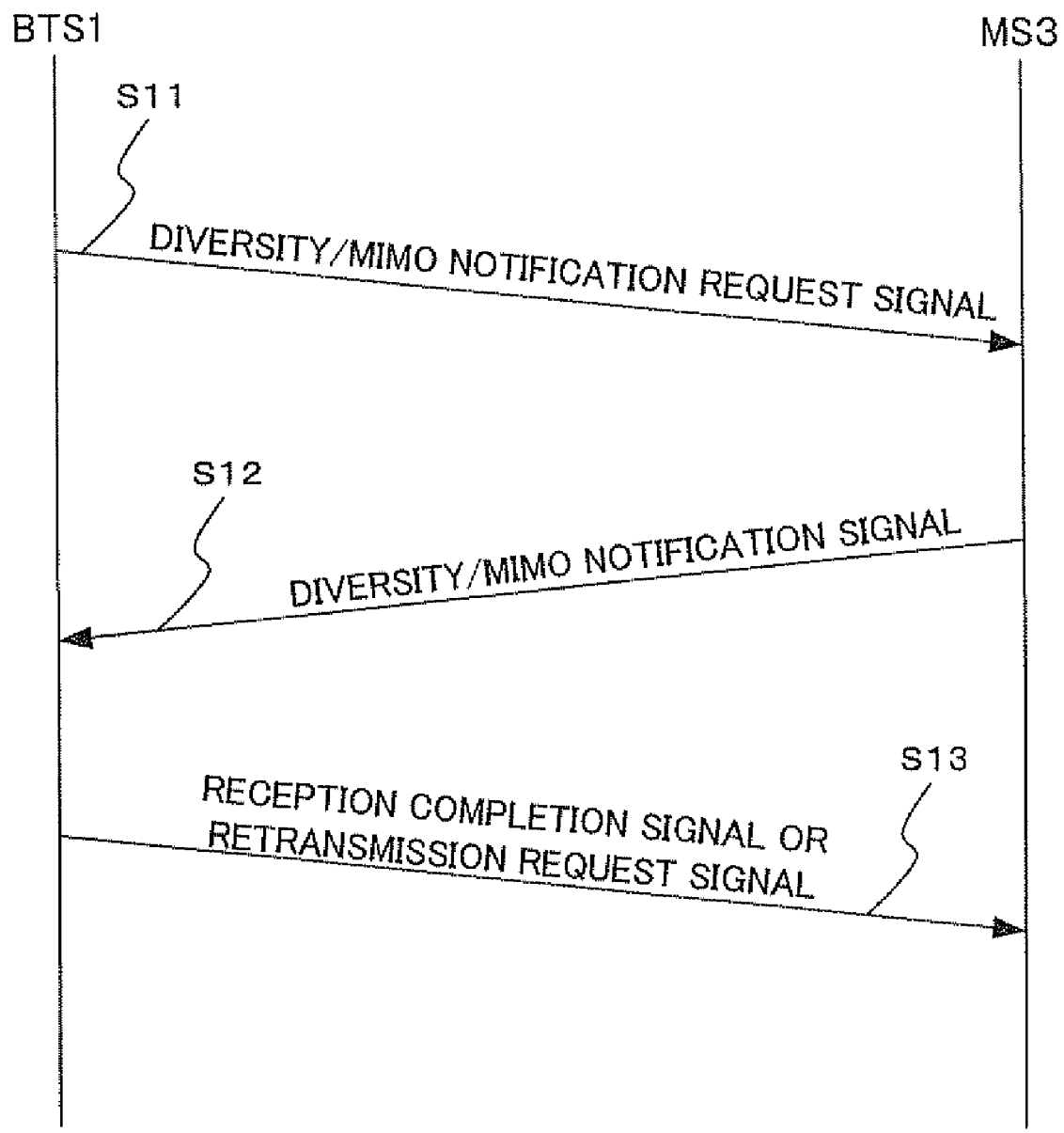
FIG. 6 is a sequence diagram illustrating diversity/MIMO processing negotiation processing between the BTS and the MS illustrated in FIG. 1.

(2) Diversity/MIMO Processing Negotiation Sequence (FIG. 6)

The BTS1 transmits a diversity/MIMO notification request signal (hereinafter, also referred to as simply "request signal") as a control signal to the MS3 which is located in a cell (sector #i) through a control channel at a regular or irregular interval (step S11). The MS3 which has received the request signal transmits a diversity/MIMO notification signal (hereinafter, simply referred to as "notification signal") which represents whether to desire diversity composition or MIMO reception processing in the BTS1 side to the BTS1 through, for example, a control channel (step S12). When the notification signal is normally received, the BTS1 transmits a reception completion signal to the MS3, and otherwise, it repetitively transmits a retransmission request signal which requests retransmission of the notification signal until the notification signal is normally received (step S13).

Therefore, the BTS1 can recognize and determine which of diversity composition and MIMO reception processing is used to process an uplink received signal (signal of a data channel) from the MS3. In other words, in the BTS1, the notification signal is transmitted to the determining unit 25 through the scheduler 24 as the decoding result of the decoding unit 23.

(3) Example of Algorithm for Processing Amount Allocation Between Sectors #i

As described above, because the collective processing amount of the signal processing units 12-$i$ (the modulating unit 21, the diversity/MIMO processing unit 22 and the decoding unit 23) is constant (there is an upper limit), an allocation of the processing amount between an uplink received signal of the subject sector #i and an uplink received signal of any other adjacent sector #j is a problem. In this example, a processing amount allocation is basically controlled such that the subject sector #i and the adjacent sector #j become same in output bit number after demodulation. Such a control can be performed by cooperation of the scheduler 24, the determining unit 25 and the parameter setting unit 26.

For example, a case of considering a modulation method, a coding rate, the number of multiplexed antennas, MIMO or diversity transmission is explained. In this case, if an uplink signal of the subject sector #i which is modulated by a modulation method=QPSK and encoded at a coding rate=½ is received in one antenna, and an uplink signal of the connecting sector #j which is modulated by a modulation method=16QAM and encoded at a coding rate=¾ is received in two antennas by MIMO transmission, a processing amount ratio between the subject sector #i and the connecting sector #j is 4×(¾)×2:2×(½)×1=6:1 in consideration of an inverse ratio.

If a received signal of any other sector (failed sector) #j as well as a received signal of the subject sector #i is also processed as described above, a maximum rate (processing amount) nearby the sector #i is reduced, but a situation that a communication is disabled in the entire cell can be avoided.

Figure 7:
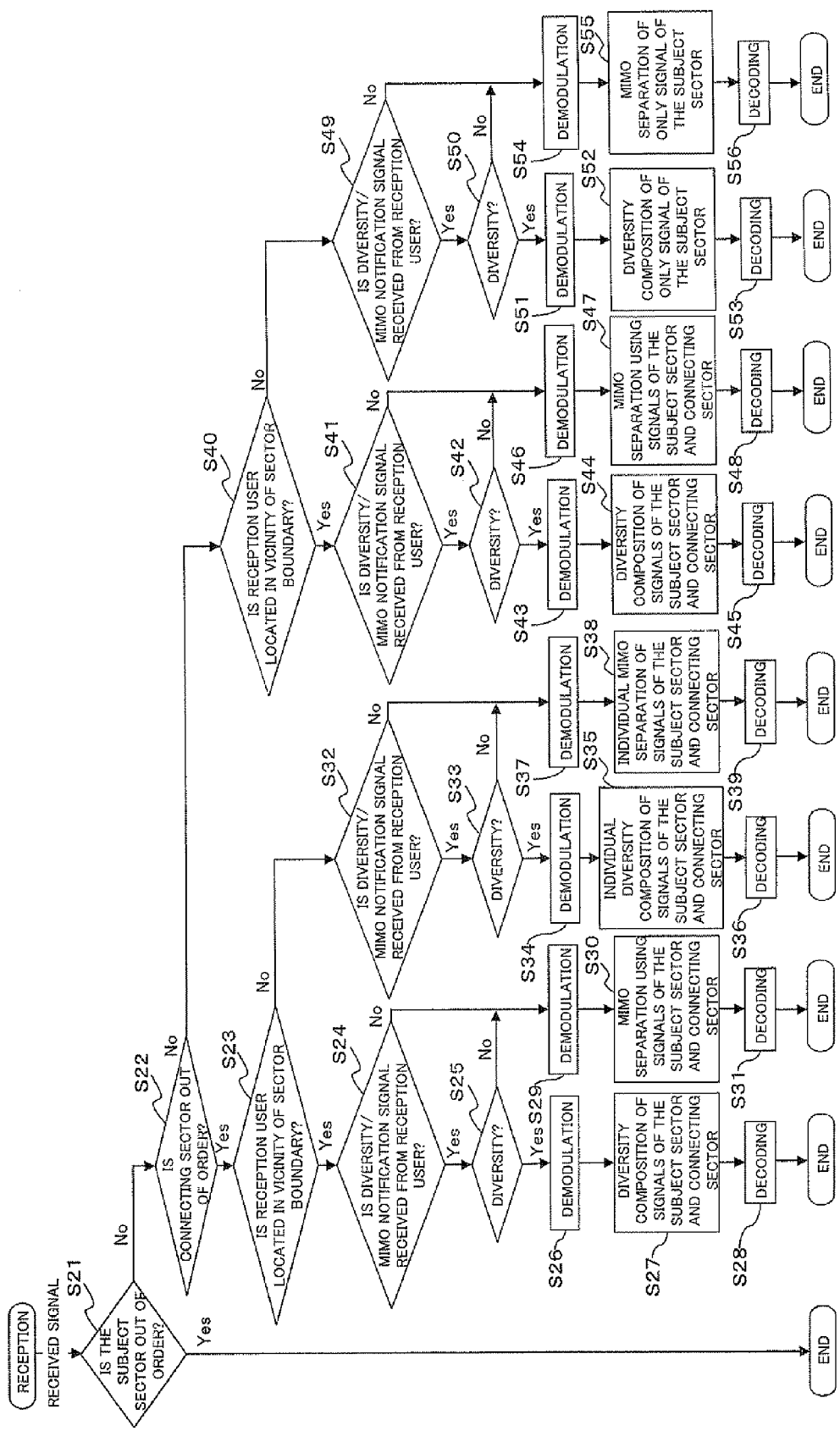
FIG. 7 is a flowchart illustrating an operation (reception processing) of the BTS illustrated in FIGS. 1, 3 and 4.
Figure 8:
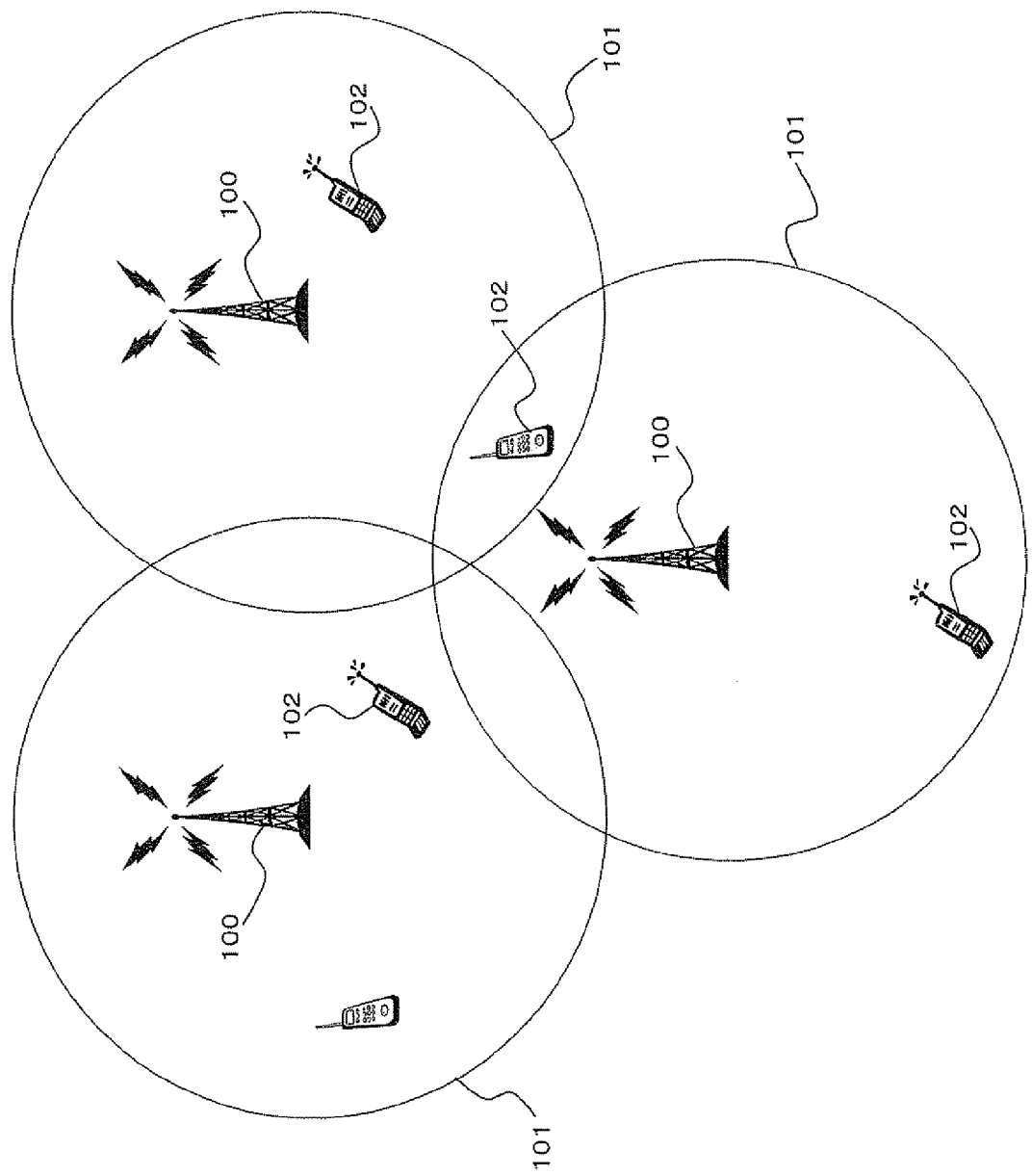
FIG. 8 is a schematic diagram illustrating an example of an existing cellular communication system.

(4) Signal Processing of Signal Processing Unit 12-i (FIG. 7)

Next, signal processing of the signal processing unit 12-i of the BTS1 will be described with reference to FIG. 7.

In the BTS1, as described above, failure information of the signal processing unit 12-i of each sector #i is collected by the failure detecting unit 13, and if the signal processing unit 12-i of a certain sector #i is out of order, failure signal is transmitted to the determining unit 25 of any other adjacent sector (connecting sector) #i to which the MS3 is connected. Upon reception of the failure signal, the signal Processing unit 12-i of the corresponding sector #i determines whether to perform also demodulation and decoding processing of the received signal of the adjacent sector #j.

In other words, the signal processing unit 12-i of the BTS1 determines an occurrence of a failure through the determining unit 25 (step S21). If it is determined that a failure has occurred (if determined as Yes in step S21), processing is finished, but if it is determined that a failure has not occurred (determined as No in step S21), it is further determined by the determining unit 25 whether the signal processing unit 12-j of the adjacent sector (connecting sector) #j to which the MS3 is connected is out of order or not (step S22).

As a result, if the signal processing unit 12-j of the adjacent sector (connecting sector) #j is out of order (if being Yes in step S22), the determining unit 25 determines whether a reception user (MS3) is located in the vicinity of a sector boundary or not (step S23). For example, the determining unit 25 determines that the MS3 is located in the vicinity of a sector boundary if a CQI value fed back from the MS3 through a control channel is less than a predetermined threshold value. Also, it is determined that the MS3 is located in the vicinity of a sector boundary if a position of the MS3 is measured by a GPS function, position information fed back through a control channel is within the vicinity of a sector boundary. The threshold value or information of the vicinity of a sector boundary which is used for the position determination is stored in a recording medium such as a memory in advance.

As a result, if it is determined that the MS3 is located in the vicinity of a sector boundary (if being Yes in step S23), the determining unit 25 determines whether the notification signal is received from the MS3 or not (step S24). If received (if being Yes in step S24), it is determined whether the notification signal is a signal which represents a desire for diversity composition or not (step S25).

If it is determined as a signal which represents a desire for diversity composition (if being Yes in step S25), the determining unit 25 instructs the parameter setting unit 26 to set a parameter necessary for demodulation and decoding to the demodulating unit 21 and the decoding unit 23 while instructing the diversity/MIMO processing unit 22 to process (diversity composition) an uplink received signal received in each sector antenna 11-i of the subject sector #i from the MS3 and an uplink received signal received in each sector antenna 11-j of the adjacent sector #j from the MS3.

As a result, a parameter setting according to the instruction of the determining unit 25 is performed with respect to the demodulating unit 21, the diversity/MIMO processing unit 22 and the decoding unit 23 by the parameter setting unit 26. The uplink received signals which are received in each sector antenna 11-i of the subject sector #i and in each sector antenna 11-j of any other sector #j that failure occurs from the MS3 are demodulated in the demodulating unit 21 (step S26 in Yes route of step S25). The demodulated signals are diversity-combined in the diversity/MIMO processing unit 22 (step S27), and are then decoded in the decoding unit 23 (step S28).

On the other hand, if it is determined in step S24 that the notification signal is not received (if being No in step S24) or if it is determined in step S25 that the received notification signal is not a signal which represents a desire for diversity composition (in other words, a signal which represents a desire for MIMO reception processing) (if being No in step S25), the determining unit 25 instructs the parameter setting unit 26 to set a parameter necessary for demodulation and decoding to the demodulating unit 21 and the decoding unit 23 while instructing the diversity/MIMO processing unit 22 to process (MIMO reception processing) an uplink received signal of the MS3 received in each sector antenna 11-i of the subject sector #i and an uplink received signal of the MS3 received in each sector antenna 11-j of the adjacent sector #j.

As a result, a parameter setting according to the instruction of the determining unit 25 is performed with respect to the demodulating unit 21, the diversity/MIMO processing unit 22 and the decoding unit 23 by the parameter setting unit 26. The uplink received signals which are received in each sector antenna 11-i of the subject sector #i and in each sector antenna 11-j of any other sector #j that failure occurs from the MS3 are demodulated in the demodulating unit 21 (step S29). The demodulated signals are subject to MIMO reception processing (MIMO signal separation) in the diversity/MIMO processing unit 22 (step S30), and are then decoded in the decoding unit 23 (step S31).

Also, if it is determined in step S23 that the MS3 is not located in the vicinity of a sector boundary (if being No in step S23), the determining unit 25 determines whether the notification signal is received from the MS3 or not (step S32). If received (if determined as Yes in step S32), the determining unit 25 determines whether the notification signal is a signal which represents a desire for diversity composition or not (step S33).

If it is determined as a signal which represents a desire for diversity composition (if determined as Yes in step S33), the determining unit 25 instructs the parameter setting unit 26 to set a parameter necessary for demodulation and decoding to the demodulating unit 21 and the decoding unit 23 while instructing the diversity/MIMO processing unit 22 to individually diversity-synthesize the uplink received signals which are received from the same MS3 in each sector antenna 11-i of the subject sector #i and in each sector antenna 11-j of the adjacent sector #j.

As a result, a parameter setting according to the instruction of the determining unit 25 is performed with respect to the demodulating unit 21, the diversity/MIMO processing unit 22 and the decoding unit 23 by the parameter setting unit 26. The uplink received signals which are received from the same MS3 in each sector antenna 11-i of the subject sector #i and in each sector antenna 11-j of the adjacent sector #j are demodulated in the demodulating unit 21 (step S34). The demodulated signals are individually diversity-combined in the diversity/MIMO processing unit 22 (step S35), and are then decoded in the decoding unit 23 (step S36).

On the other hand, if it is determined in step S32 that the notification signal is not received (if being No in step S32) or if it is determined in step S33 that the received notification signal is not a signal which represents a desire for diversity composition (in other words, a signal which represents a desire for MIMO reception processing) (if being No in step S33), the determining unit 25 instructs the parameter setting unit 26 to set a parameter necessary for demodulation and decoding to the demodulating unit 21 and the decoding unit 23 while instructing the diversity/MIMO processing unit 22 to individually process (MIMO signal separation) the uplink received signals which are received from the same MS3 in each sector antenna 11-$i$ of the subject sector #i and in each sector antenna 11-$j$ of the adjacent sector #j.

As a result, a parameter setting according to the instruction of the determining unit 25 is performed with respect to the demodulating unit 21, the diversity/MIMO processing unit 22 and the decoding unit 23 by the parameter setting unit 26. The uplink received signals which are received from the same MS3 in each sector antenna 11-$i$ of the subject sector #i and in each sector antenna 11-$j$ of the adjacent sector #j are demodulated in the demodulating unit 21 (step S37). The demodulated signals are individually subject to MIMO signal separation in the diversity/MIMO processing unit 22 (step S38), and are then decoded in the decoding unit 23 (step S39).

If it is determined in step S22 that failure does not occur in the signal processing unit 12-$j$ of the adjacent sector #j (if being No in step S22), the determining unit 25 determines whether the reception user (MS3) is located in the vicinity of a sector boundary or not based on the CQI value or position information measured by a GPS (step S40).

If it is determined that the MS3 is located in the vicinity of a sector boundary (if being Yes in step S40), the determining unit 25 determines whether the notification signal is received from the MS3 or not (step S41). If received (if being Yes in step S41), the determining unit 25 determines whether the notification signal is a signal which represents a desire for diversity composition or not (step S42).

If it is determined as a signal which represents a desire for diversity composition (if being Yes in step S42), the determining unit 25 instructs the parameter setting unit 26 to set a parameter necessary for demodulation and decoding to the demodulating unit 21 and the decoding unit 23 while instructing the diversity/MIMO processing unit 22 to diversity-synthesize the uplink received signals which are received from the same MS3 in each sector antenna 11-$i$ of the subject sector #i and in each sector antenna 11-$j$ of the adjacent sector #j.

As a result, a parameter setting according to the instruction of the determining unit 25 is performed with respect to the demodulating unit 21, the diversity/MIMO processing unit 22 and the decoding unit 23 by the parameter setting unit 26. The uplink received signals which are received from the same MS3 in each sector antenna 11-$i$ of the subject sector #i and in each sector antenna 11-$j$ of the adjacent sector #j are respectively demodulated in the demodulating unit 21 (step S43). The demodulated signals are diversity-combined in the diversity/MIMO processing unit 22 (step S44), and are then decoded in the decoding unit 23 (step S45).

On the other hand, if it is determined in step S41 that the notification signal is not received (if being No in step S41) or if it is determined in step S42 that the received notification signal is not a signal which represents a desire for diversity composition (in other words, a signal which represent a desire for MIMO reception processing) (if being No in step S42), the determining unit 25 instructs the parameter setting unit 26 to set a parameter necessary for demodulation and decoding to the demodulating unit 21 and the decoding unit 23 while instructing the diversity/MIMO processing unit 22 to perform MIMO reception processing using the uplink received signal of the MS3 received in each sector antenna 11-$i$ of the subject sector #i and the uplink received signal of the MS3 which is received in each sector antenna 11-$j$ of the adjacent sector #j.

As a result, a parameter setting according to the instruction of the determining unit 25 is performed with respect to the demodulating unit 21, the diversity/MIMO processing unit 22 and the decoding unit 23 by the parameter setting unit 26. The uplink received signal received in each sector antenna 11-$i$ of the subject sector #i and The uplink received signal received in each sector antenna 11-$j$ of the adjacent sector #j are respectively demodulated in the demodulating unit 21 (step S46). The demodulated signals are subject to MIMO signal separation in the diversity/MIMO processing unit 22 (step S47), and are then decoded in the decoding unit 23 (step S48).

If it is determined in step S40 that the MS3 is not located in the vicinity of a sector boundary (if being No in step S40), the determining unit 25 determines whether the notification signal is received from the MS3 or not (step S49). If received (if being Yes in step S49), the determining unit 25 determines whether the notification signal is a signal which represents a desire for diversity composition or not (step S50).

If it is determined as a signal which represents a desire for diversity composition (if being Yes in step S50), the determining unit 25 instructs the parameter setting unit 26 to set a parameter necessary for demodulation and decoding to the demodulating unit 21 and the decoding unit 23 while instructing the diversity/MIMO processing unit 22 to diversity-synthesize only the uplink received signal of the MS3 received in each sector antenna 11-$i$ of the subject sector #i.

As a result, a parameter setting according to the instruction of the determining unit 25 is performed with respect to the demodulating unit 21, the diversity/MIMO processing unit 22 and the decoding unit 23 by the parameter setting unit 26. The uplink received signal received in each sector antenna 11-$i$ of the subject sector #i is demodulated in the demodulating unit 21 (step S51). The demodulated signal is diversity-combined in the diversity/MIMO processing unit 22 (step S52), and is then decoded in the decoding unit 23 (step S53).

On the other hand, if it is determined in step S49 that the notification signal is not received (if being No in step S49) or if it is determined in step S50 that the received notification signal is not a signal which represents a desire for diversity composition (in other words, a signal which represent a desire for MIMO reception processing) (if being No in step S50), the determining unit 25 instructs the parameter setting unit 26 to set a parameter necessary for demodulation and decoding to the demodulating unit 21 and the decoding unit 23 while instructing the demodulating unit 21 and the diversity/MIMO processing unit 22 to respectively perform demodulation and MIMO reception processing of the uplink received signal of the MS3 received in each sector antenna 11-$i$ of the subject sector #i.

As a result, a parameter setting according to the instruction of the determining unit 25 is performed with respect to the demodulating unit 21, the diversity/MIMO processing unit 22 and the decoding unit 23 by the parameter setting unit 26. The uplink received signal received in each sector antenna 11-$i$ of the subject sector #i is demodulated in the demodulating unit 21 (step S54). The demodulated signal is subject to MIMO signal separation in the diversity/MIMO processing unit 22 (step S55), and is then decoded in the decoding unit 23 (step S56).

As described above, according to the BTS1, if signals are received in the sector antennas 11-$i$ of the different sectors #i from the same MS3 like an uplink signal from the MS3 located in the vicinity of a sector boundary, the signals are subjected to diversity or MIMO reception processing to thereby improve the gain of the received signal, whereby the throughput of the sector #i and the cell can be greatly improved by improving an error rate characteristic of a signal that reception characteristics are poor.

The antenna unit 10-*i* (sector antenna 11-*i*) which is assigned for each sector #i is physically, fixedly connected to a plurality of signal processing units 12-*i*, and the signal processing unit 12-*i* of any sector #i can process a signal received in the sector antenna 11-*j* of any other sector #j. Therefore, even when the signal processing unit 12-*i* of a certain sector #i cannot normally operate due to a failure, the signal processing unit 12-*j* of any other sector #j takes over processing to avoid a situation that a communication is disabled without needing individual components for switching of the existing NE configuration, thereby greatly improving communication reliability.

According to the embodiment, at least one of the following effects or advantages is obtained.

(1) When antenna units of different wireless zones receive signals from a single mobile terminal like an uplink signal received from a wireless terminal located in the vicinity of a wireless zone boundary, because the gain of received signals can be improved by performing multi-antenna reception processing (for example, diversity or MIMO reception processing) using these signals, the throughput of the wireless zone and accordingly the throughput of the entire base station apparatus can be improved by improving an error rate characteristic of a signal of the reception characteristics which are poor.

(2) Because an antenna unit that is assigned to each of different wireless zones (for example, sectors in a cellular communication system) is connected to a plurality of signal processing units, the signal processing unit of any wireless zone can perform reception processing using a signal received in an antenna unit of a different wireless zone. Therefore, even when the signal processing unit of a certain wireless zone cannot be used due to a failure or the like, the signal processing unit of a different wireless zone takes over the processing without necessitating individual components for switching in the existing NE structure, whereby a situation that a communication is disabled can be avoided, and communication reliability can be sufficiently improved.

As described above, according to the embodiment, a base station apparatus in which the throughput is improved by improving communication reliability or reception characteristics of a received signal with a deteriorated quality such as that received from the vicinity of a sector boundary at a low cost without employing a conventional redundant structure can be realized, and thus is very useful in a wireless communication technology field, particularly, in a mobile communication technology field.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A base station apparatus that wirelessly communicates with a wireless terminal, the base station apparatus comprising:
   a plurality of antenna units that form a plurality of wireless zones, converts a received signal from the wireless zone into a baseband signal, and outputs the baseband signal; and
   a plurality of signal processors that are provided corresponding to the plurality of antenna units, and processes the baseband signal,
   wherein the signal processor is coupled at least to a corresponding antenna unit and another antenna unit, and
   the signal processor includes:
   a controller that allocates a part of resources for processing a baseband signal converted by the corresponding antenna unit to processing of a baseband signal converted by the other antenna unit; and
   a multi-antenna reception processor that performs multi-antenna reception processing of baseband signals converted by the corresponding antenna unit and the other antenna unit from the wireless terminal using the resources.

2. The base station apparatus according to claim 1, wherein the multi-antenna reception processor is configured as a diversity/MIMO reception processor that performs diversity or MIMO reception processing of the received signals.

3. The base station apparatus according to claim 2, wherein the diversity/MIMO reception processor is configured to select diversity or MIMO reception processing based on a notification signal from the wireless terminal.

4. The base station apparatus according to claim 1, wherein the controller includes:
   a determining unit that determines whether the baseband signals are signals from the wireless terminal that is located in the vicinity of a boundary between different wireless zones; and
   a first setting unit that allocates a part of the resources to processing of a baseband signal converted by the other antenna unit when the determining unit determines that the baseband signals are signals from the wireless terminal that is located in the vicinity of a boundary between different wireless zones.

5. The base station apparatus according to claim 1, further comprising a malfunction monitoring unit that monitors a malfunction occurring in any of the signal processor,
   wherein the controller unit includes a second setting unit that allocates a part of the resources to processing of a baseband signal converted by the other antenna unit when the malfunction monitoring unit detects a malfunction occurring in another signal processor.

6. The base station apparatus according to claim 1, wherein the base station apparatus is a base station apparatus in a cellular communication system, and
   the antenna unit and the signal processor are provided for each sector as the wireless zone.

7. A reception processing method of a base station apparatus that wirelessly communicates with a wireless terminal, the base station apparatus including a plurality of antenna units that form a plurality of wireless zones, converts a received signal from the wireless zone into a baseband signal, and outputs the baseband signal and a plurality of signal processors that are provided corresponding to the plurality of antenna units, and processes the baseband signal, the signal processor being coupled at least to a corresponding antenna unit and another antenna unit, the reception processing method comprising:

at the signal processor,
allocating a part of resources for processing a baseband signal converted by the corresponding antenna unit to processing of a baseband signal converted by the other antenna unit; and
performing multi-antenna reception processing of the baseband signals converted by the corresponding antenna unit and the other antenna unit from the wireless terminal using the resources.

8. The reception processing method according to claim 7, wherein the signal processor performs diversity or MIMO reception processing of the received signals.

9. The reception processing method according to claim 8, wherein the signal processor performs diversity or MIMO reception processing based on a notification signal from the wireless terminal.

10. The reception processing method according to claim 7, further comprising:
determining whether the baseband signals are signals from the wireless terminal that is located in the vicinity of a boundary between different wireless zones; and
allocating a part of the resources to processing of a baseband signal converted by the other antenna unit when determined that the baseband signals are signals from the wireless terminal that is located in the vicinity of a boundary between different wireless zones.

11. The reception processing method according to claim 7, further comprising:
monitoring a malfunction occurring in any of the signal processors, and
allocating a part of the resources to processing of a baseband signal converted by the other antenna unit when a malfunction occurring in another signal processor is detected by the monitoring.

12. The reception processing method according to claim 7, wherein the base station apparatus is a base station apparatus in a cellular communication system, and
the antenna unit and the signal processor are provided for each sector as the wireless zone.

* * * * *